US006944362B2

(12) United States Patent
Jasti

(10) Patent No.: US 6,944,362 B2
(45) Date of Patent: Sep. 13, 2005

(54) OPTICAL SWITCH HAVING A AUTORESTORATION FEATURE FOR SWITCHING FROM A BACKUP OPTICAL PATH TO A PRIMARY OPTICAL PATH

(75) Inventor: Chandra Sekhar Jasti, Cupertino, CA (US)

(73) Assignee: General Instrument Corporation, Horsham, PA (US)

( * ) Notice: Subject to any disclaimer, the term of this patent is extended or adjusted under 35 U.S.C. 154(b) by 97 days.

(21) Appl. No.: 10/364,825

(22) Filed: Feb. 11, 2003

(65) Prior Publication Data

US 2004/0156579 A1 Aug. 12, 2004

(51) Int. Cl.$^7$ .......................... H04J 14/00; G02B 6/26; G20B 6/42
(52) U.S. Cl. ........................ 385/16; 385/24; 398/34; 398/45
(58) Field of Search ................. 385/15–18, 24, 385/48, 100; 398/4–6, 16, 30–32, 34, 43, 45, 49–50, 91; 359/20

(56) References Cited

U.S. PATENT DOCUMENTS

| | | | | |
|---|---|---|---|---|
| 6,005,694 A | * | 12/1999 | Liu ................................ | 398/6 |
| 6,160,648 A | * | 12/2000 | Oberg et al. .................... | 398/4 |
| 6,556,319 B2 | * | 4/2003 | Feinberg et al. ............... | 398/5 |
| 6,563,979 B2 | * | 5/2003 | Feinberg et al. ............... | 385/24 |
| 6,704,508 B1 | * | 3/2004 | Asahi ........................... | 398/30 |
| 6,714,740 B2 | * | 3/2004 | Tajima ......................... | 398/31 |
| 2002/0197004 A1 | * | 12/2002 | Feinberg et al. .............. | 385/24 |
| 2003/0185562 A1 | * | 10/2003 | Feinberg et al. ............... | 398/5 |
| 2004/0105136 A1 | * | 6/2004 | Feinberg ....................... | 359/20 |

OTHER PUBLICATIONS

Castor: Precision Optical Switches for High Reliability Networks; date unknown, but before the filing date of U.S. App. 10/364,825.

Constellation Series, Section 12. Castor 2×2 Optical Switch. pp. 12–1 to 12–16. Release date: Aug. 1999—Revision 0.
Constellation Series, Section 11. Castor 2×1 Optical Switch. pp. 11–1 to 11–16. Release date: Aug. 1999—Revision 0.
Synchronous: Castor Precision Optical Switches for High Reliability Networks. http://www.synchronous.net/products/castor.html; accessed Oct. 8, 2002.

\* cited by examiner

*Primary Examiner*—Frank G. Font
*Assistant Examiner*—Mary El-Shammaa
(74) *Attorney, Agent, or Firm*—Mayer Fortkort & Williams PC; Stuart H. Mayer, Esq.; Karin L. Williams, Esq.

(57) ABSTRACT

Optical switches are provided in an optical transmission system having at least two optical nodes in optical communication over a primary optical path and a backup optical path. An optical switch is located in each of the optical nodes. Each of the optical switches includes a switching element having an input port and a plurality of output ports coupled to the primary and backup optical paths, respectively. The switching element has a first state optically coupling an optical signal from the input port to the primary path and a second state optically coupling an optical signal from the input port to the backup path. First and second optical taps are located in the primary optical path. Third and fourth optical taps are located in the backup optical path. A first photodetector is optically coupled to the second optical tap for receiving a portion of the optical signal traveling in the primary optical path. A second photodetector is optically coupled to the third optical tap for receiving a portion of the optical signal traveling in the secondary optical path. A first optical path optically couples the first optical tap to the fourth optical tap such that a portion of an optical signal traveling in the secondary path is coupled onto the primary path. Finally, a controller is electrically coupled to each of the optical switches. The controller is configured so that when each of the switching elements are in the second state and the first photodetector in each of the optical switches detects an optical signal, the controller returns the switching elements to the first state.

6 Claims, 1 Drawing Sheet

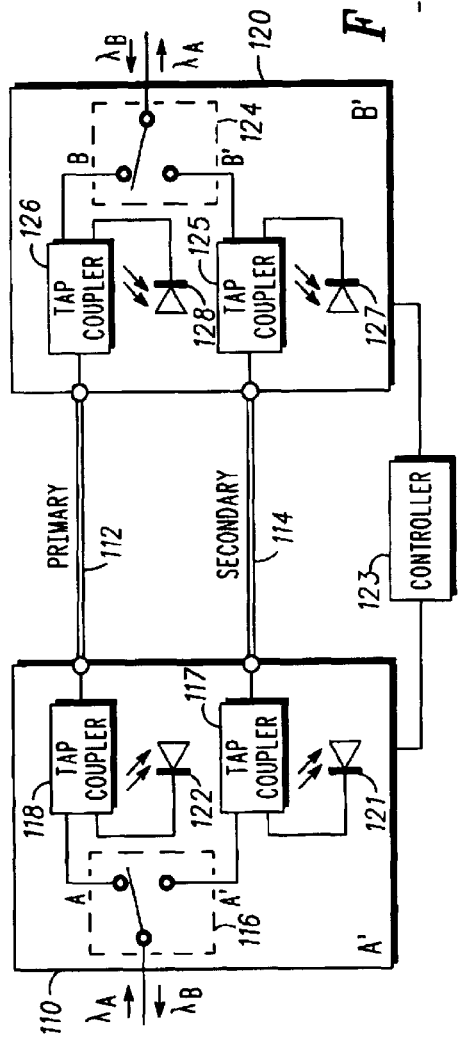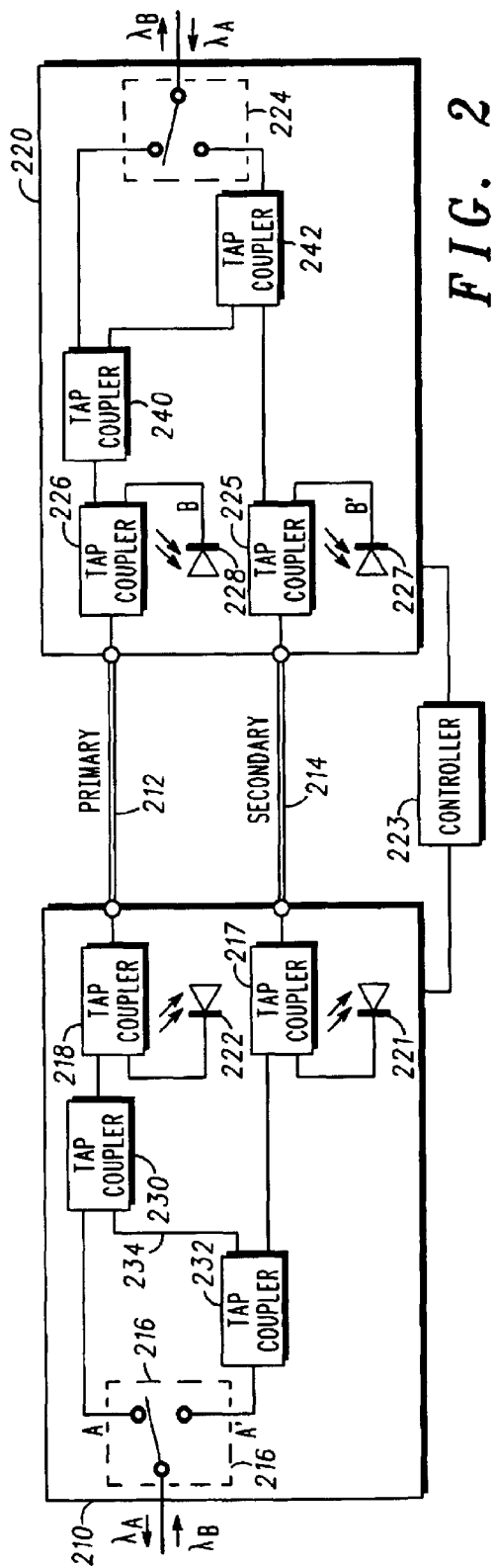

US 6,944,362 B2

OPTICAL SWITCH HAVING A AUTORESTORATION FEATURE FOR SWITCHING FROM A BACKUP OPTICAL PATH TO A PRIMARY OPTICAL PATH

FIELD OF THE INVENTION

The present invention relates generally to optical switches, and more particularly to an optical switch that restores optical traffic from a secondary optical transmission path to a primary optical transmission path after a fault in the primary optical transmission path has been repaired.

BACKGROUND OF THE INVENTION

Currently, transmission systems employed in the cable television (CATV) industry provide two-way transmission of information; e.g., video, audio, multimedia and/or data; between a head end and a plurality of subscribers. Typically, the head end transmits the information destined for individual subscribers ("downstream information") in an optical format, via one or more fiber optic links, to one or more optical nodes. Each node converts the optically-formatted downstream information into electrical signals for distribution, typically via a coaxial cable plant having a tree and branch architecture, to individual subscribers. In addition to receiving the downstream information, each individual subscriber may generate information in the form of voice, video, data, or any combination thereof, destined for the bead end. The subscriber-generated information ("upstream information") is aggregated by the coaxial cable plant and passes to the node for conversion into an optical format for transmission to the head end.

CATV service providers and their subscribers are accustomed to high reliability service. One way in which high reliability is achieved is by providing two optical paths between the head end and each optical node, one of which serves as a primary optical path and the other of which serves as a secondary or backup optical path. An optical switch switches the optical information signals from the primary path to the secondary path in the event of an unanticipated failure in the primary path. The optical switches are often located in the head end and the optical nodes.

The aforementioned optical switches generally employ an optomechanical switching component that switches between the primary path and the secondary path based on the electrical voltage that is applied to it. A portion of the optical signal in the primary and secondary paths is tapped off and converted to an electrical voltage. The voltages are monitored and if a threshold condition is violated, indicating a failure in the primary path, the switch is activated so that traffic is transferred to the secondary path. Unfortunately, the optical switch does not include any arrangement for switching back from the secondary to the primary path after the primary path has been restored. Rather, an operator or technician must perform a manual power cycle to restart the optical switches in both the head end and the optical node so that the switches return to the primary path. Restoration in this manner can be difficult because the head end and the optical node may be located 50 to 100 km apart from one another. Also, there may be many such optical switches in both the head end and the nodes, thus requiring the operator to take proper care to ensure that the correct combination of switches are power cycled so that there is no interference with traffic on the other paths.

Accordingly, it would be desirable to provide a method and apparatus for automatically restoring optical traffic from a secondary optical transmission path to a primary optical transmission path after a fault in the primary optical transmission path has been repaired without the need to perform a manual power cycle.

SUMMARY OF THE INVENTION

In accordance with the present invention, optical switches are provided in an optical transmission system having at least two optical nodes in optical communication over a primary optical path and a backup optical path. An optical switch is located in each of the optical nodes. Each of the optical switches includes a switching element having an input port and a plurality of output ports coupled to the primary and backup optical paths, respectively. The switching element has a first state optically coupling an optical signal from the input port to the primary path and a second state optically coupling an optical signal from the input port to the backup path. First and second optical taps are located in the primary optical path. Third and fourth optical taps are located in the backup optical path. A first photodetector is optically coupled to the second optical tap for receiving a portion of the optical signal traveling in the primary optical path. A second photodetector is optically coupled to the third optical tap for receiving a portion of the optical signal traveling in the secondary optical path. A first optical path optically couples the first optical tap to the fourth optical tap such that a portion of an optical signal traveling in the secondary path is coupled onto the primary path. Finally, a controller is electrically coupled to each of the optical switches. The controller is configured so that when each of the switching elements are in the second state and the first photodetector in each of the optical switches detects an optical signal, the controller returns the switching elements to the first state.

In accordance with one aspect of the invention, the two optical nodes respectively comprise a head end and an optical node in a CATV transmission system.

In accordance with another aspect of the invention, the switching element is an optomechanical switching element.

In accordance with yet another aspect of the invention, the first and second photodetectors are photodiodes.

In accordance with another aspect of the invention, the primary and secondary optical paths are unidirectional paths. Alternatively, the primary and secondary optical paths may be bi-directional paths.

In accordance with another aspect of the invention, a method is provided for switching optical traffic from a secondary optical path to a primary optical path, each of which establish an optical communication path between first and second optical nodes. The method begins by: detecting a presence or absence of an optical signal traveling in the primary path through the first optical node; detecting a presence or absence of an optical signal traveling in the primary path through the second optical node; detecting a presence or absence of an optical signal traveling in the secondary path through the first optical node; and detecting a presence or absence of an optical signal traveling in the secondary path through the second optical node. A portion of an optical signal traveling in the first optical node is coupled from the secondary path to the primary path. A switching element is switched in each of the first and second optical nodes from a second state to a first state so that the optical traffic traverses the primary optical path when an optical signal is detected traveling in the primary path through both the first and second optical nodes.

BRIEF DESCRIPTION OF THE DRAWINGS

FIG. 1 shows a simplified block diagram of a conventional arrangement for providing a primary and second optical path between the head end and an optical node in a CATV transmission system.

FIG. 2 shows a simplified block diagram of an arrangement for providing a primary and second optical path between the head end and an optical node in a CATV transmission system in accordance with the present invention.

DETAILED DESCRIPTION OF THE INVENTION

FIG. 1 shows a simplified block diagram of a conventional arrangement for providing a primary and second optical path between the head end and an optical node in a CATV transmission system. Optical switches 110 and 120 are located in the head end and the optical node, respectively. Optical transmission path 112 serves as the primary path while optical transmission path 114 serves as the secondary or backup optical path. Traffic along the primary path 112 and the secondary path 114 may be unidirectional or bi-directional. Optical switch 110 includes an optomechanical switching element 116, tap couplers 117 and 118 and photodiode 121 and 122. Likewise, optical switch 120 includes an optomechanical switching element 124, tap couplers 125 and 126 and photodiodes 127 and 128. A switch controller 127 controls the operation of switches 110 and 120.

Referring to switch 110, tap couplers 118 and 121 respectively couple a small portion of the optical signals traveling in paths 112 and 114 to photodiodes 121 and 122. Controller 123 receives the electrical signals from the photodiodes 121 and 122 and determines the position of the optomechanical switching element 124. As shown, switch 120 is configured in a manner similar to switch 110.

In operation, switches 110 and 120 are initially in states A and B, respectively. That is, the switches 110 and 120 provide a continuous optical path to points A and B on the primary path so that the signals are transmitted along the primary path 112. If transmission along the primary path 112 is now lost because of a fiber break, the controller 127 will respectively force the optomechanical switching elements 116 and 124 to switch from positions A and B to positions A' and B', respectively. As a result, traffic is now transported along the secondary path 114. As previously mentioned, transmission will continue along the secondary path 114 even after the primary path 112 has been restored. The only way to restore switches 110 and 120 to states A and B, respectively, is to perform a manual power cycling in which the optomechanical switching elements 116 and 124 return to their initial states. This limitation is overcome with the inventive optical switches depicted in FIG. 2.

FIG. 2 shows a simplified block diagram of an arrangement for providing a primary and second optical path between the head end and an optical node in a CATV transmission system in accordance with the present invention. Optical switches 210 and 220, which are located in the head end and the optical node, respectively, switch optical traffic between primary transmission path 212 and secondary transmission path 214. Optical switch 210 includes an optomechanical switching element 216, tap couplers 217, 218, 230 and 232 and photodetectors 221 and 222. Likewise, optical switch 220 includes an optomechanical switching element 224, tap couplers 225, 226, 240 and 242 and photodetectors 227 and 228. A switch controller 223 controls the operation of switches 210 and 220.

Optomechanical switching elements 216 may be any arrangement that employs physical motion of one or more optical elements to perform optical switching. In this way, a spatial displacement of a reflected beam is affected. Photodetectors 221, 222, 227 and 228 may be any component that converts an optical signal received from the tap couplers to an electrical signal such as a photodiode, for example.

Referring to switch 210 in more detail, tap couplers 218 and 217 respectively couple a small portion of the optical signals traveling in paths 212 and 214 to photodiodes 222 and 221. In addition, tap couplers 230 and 232 are also located in the primary path 212 and the secondary path 214, respectively. Tap coupler 230 couples a small portion of the optical traffic traveling along the primary path 212 and directs it along optical fiber 234 to tap coupler 232. Tap coupler 232, in turn, couples the portion of the optical traffic received from primary path 212 onto the secondary path 214. That is, a portion of the traffic traveling along the primary path 212 is placed on the secondary path 214. Likewise, tap coupler 232 couples a small portion of the optical traffic traveling along the secondary path 214 and directs it along optical fiber 234 to tap coupler 230. Tap coupler 230, in turn, couples the portion of the optical traffic from the secondary path 214 onto the primary path 212. That is, a portion of the traffic traveling along the secondary path 214 is placed on the primary path 212. As shown, switch 220 is configured in a manner similar to switch 210.

In operation, assume switches 210 and 220 are in states A' and B', respectively, as a result of a fiber break along the primary path 212. A small portion of the optical signal traveling in the secondary path 214 is coupled to the primary path 212. Photodetector 222 in switch 210 detects the signal but, because of the fiber break, photodetector 228 in switch 220 will not detect the portion of the signal tapped from the secondary transmission path 214. However, when the primary path 212 has been restored, both photodetectors 222 and 228 will detect the portion of the signal tapped from the secondary transmission path 214. In response to the signals detected by both photodetectors 222 and 228, controller 223 activates the optomechanical switching elements 216 and 224 so that the switches 210 and 220 are returned to state A and B. That is, the transmission is automatically restored to the primary state. Power cycling is not required at either, the head end or the optical node.

The state of the optomechanical switching elements 216 and 224 is determined by the voltage that is applied to them via electrical boards incorporated into the switches 216 and 224. A threshold condition is established for the switches 216 and 224 in software that determine the value of the voltage pulse (or current pulse) that changes their state. The threshold condition can be adjusted either by the operator or can be factory-set based on the distance over which the signal is transmitted and customer requirements.

The analog voltages generated by the photodetectors are directed to the controller 223 via logarithmic amplifiers, which are used by firmware to determine the appropriate state of the optomechanical switching elements. The firmware then sends a voltage pulse (or current pulse) to the optomechanical switching elements 216 and 224 to switch them from the primary path to the secondary path, or visa versa.

Although various embodiments are specifically illustrated and described herein, it will be appreciated that modifications and variations of the present invention are covered by the above teachings and are within the purview of the appended claims without departing from the spirit and intended scope of the invention. For example, while the invention has been described in terms of an optical switch that provides a secondary or backup path in a CATV system, the optical switch more generally may be employed in any optical transmission system in which a backup path is to be provided.

What is claimed is:

1. In an optical transmission system having at least two optical nodes in optical communication over a primary optical path and a backup optical path, an optical switch located in each of the optical nodes, each of said optical switches comprising:

a switching element having an input port and a plurality of output ports coupled to the primary and backup optical paths, respectively, said switching element having a first state optically coupling an optical signal from the input port to the primary path and a second state optically coupling an optical signal from the input port to the backup path;

first and second optical taps located in the primary optical path;

third and fourth optical taps located in the backup optical path;

a first photodetector optically coupled to the second optical tap for receiving a portion of the optical signal traveling in the primary optical path;

a second photodetector optically coupled to the third optical tap for receiving a portion of the optical signal traveling in the secondary optical path; and a first optical path optically coupling the first optical tap to the fourth optical tap such that a portion of an optical signal traveling in the secondary path is coupled onto the primary path; and a controller electrically coupled to each of the optical switches, said controller being configured so that when each of the switching elements are in said second state and the first photodetector in each of the optical switches detects an optical signal, said controller returns the switching elements to said first state.

2. In the system of claim 1 wherein said two optical nodes comprise a head end and an optical node in a CATV transmission system.

3. In the system of claim 1 an optical switch wherein said switching element is an optomechanical switching element.

4. In the system of claim 1, an optical switch wherein said first and second photodetectors are photodiodes.

5. In the system of claim 1, an optical switch wherein the primary and secondary optical paths are unidirectional paths.

6. In the system of claim 1, an optical switch wherein the primary and secondary optical paths are bi-directional paths.

* * * * *

UNITED STATES PATENT AND TRADEMARK OFFICE
CERTIFICATE OF CORRECTION

PATENT NO. : 6,944,362 B2
DATED : September 13, 2005
INVENTOR(S) : Chandra Sekhar Jasti It is certified that error appears in the above-identified patent and that said Letters Patent is hereby corrected as shown below:

Column 1,
Line 28, after "the", change "bead" to -- head --.

Column 4,
Line 34, after "either", delete ",".

Signed and Sealed this

Fourth Day of April, 2006

JON W. DUDAS
*Director of the United States Patent and Trademark Office*